United States Patent [19]

Kamath

[11] 4,125,696

[45] Nov. 14, 1978

[54] POLYMERIZATION PROCESS USING DI-T-BUTYL DIPEROXYCARBONATE AS A FINISHING CATALYST

[75] Inventor: Vasanth R. Kamath, Tonawanda, N.Y.

[73] Assignee: Pennwalt Corporation, Philadelphia, Pa.

[21] Appl. No.: 757,188

[22] Filed: Jan. 6, 1977

[51] Int. Cl.$^2$ .......................... C08F 2/00; C08F 4/34; C08F 4/38; C08F 112/08

[52] U.S. Cl. ...................... 526/73; 526/228; 526/346

[58] Field of Search .................... 526/73, 228

[56] References Cited

U.S. PATENT DOCUMENTS

| | | | |
|---|---|---|---|
| 3,534,009 | 10/1970 | Beresniewicz | 526/73 |
| 3,743,630 | 7/1973 | Wood | 526/228 |

FOREIGN PATENT DOCUMENTS

| | | | |
|---|---|---|---|
| 848,620 | 10/1960 | United Kingdom | 526/73 |
| 1,243,197 | 8/1971 | United Kingdom | 526/73 |

OTHER PUBLICATIONS

"Organic Perioxides", Swern Ed. vol. 1, pp. 81–86, Wiley Intersci.
"Polymer Handbook", Brandrup et al.; II-1 to II-5S, Decomposition Rates of Organic Free Due Radical Initiators.

*Primary Examiner*—Herbert J. Lilling

[57] ABSTRACT

A process for the free-radical polymerization of a vinyl monomer, including vinyl aromatic monomer, at least two distinct, progressively higher polymerization temperatures, each between the temperatures of from about 50° C and 130° C, in the presence of at least two free-radical initiators, one of which, used in relatively minor proportions, is di-t-butyl diperoxycarbonate and the other, used in relatively major proportions, has a ten hour half-life temperature below 90° C. The distinct temperatures for polymerization may occur as separate parts of a polymerization in which the temperature of the system continually increases.

5 Claims, No Drawings

POLYMERIZATION PROCESS USING DI-T-BUTYL DIPEROXYCARBONATE AS A FINISHING CATALYST

BACKGROUND AND THE PRIOR ART

In the polymerization of vinyl monomers (especially vinyl aromatic monomers), the resultant polymer can contain significant amounts of residual monomer. This frequently leads to undesirable properties such as high shrinkage in boiling water, poor heat deflection temperature, potential discoloration due to oxidation of the monomer, objectionable odor etc. The prior art describes many attempts to obtain vinyl aromatic polymers having a low residual monomer content (e.g. no more than 0.1% by weight). One means of reducing the residual monomer content is to include a coinitiator, typically in minor amount, that is, a finishing catalyst. Usually the finishing catalyst has a higher 10 hour half life temperature than the other initiator.

In one prior art method, (British Plastics, p. 26, January 1957), the polymer (polystyrene) is extruded through a devolatilizer where the residual monomer is removed at 225° C. This method requires a large number of devolatilizers to handle large production volumes and the polymer must be heated to high temperatures which can lead to polymer degradation and poor physical properties.

U.S. Pat. No. 3,743,630 (issued July 3, 1973) to Wood describes the polymerization of styrene using ring substituted alkyl perbenzoates and branched chain alkyl perbenzoates. Compared with a t-butyl perbenzoate initiator, by using ring substituted alkyl perbenzoate (as a finishing catalyst) in combination with benzoyl peroxide, polystyrene (i.e. less than 0.1% by weight) with lower residual styrene can be obtained in less than 15 but more than 10 hours of polymerization time.

Canadian Pat. No. 915,850, issued Nov. 28, 1972 to Doak and Carrock describes the use of a minor amount of t-butyl peracetate or t-butylperoxy isopropyl carbonate (as finishing catalysts) and a major amount of benzoyl peroxide to obtain polystyrene which is substantially monomer free. The benzoyl peroxide is described as a low temperature organic peroxide initiator component. However, the polymerization time required is quite long (i.e. greater than 10 hours). The polymerization is conducted in suspension in two separate heating stages. The first stage of the polymerization is conducted at 75° C.–100° C. and the second stage at 105° C.–145° C. (for 1–5 hours).

British Pat. No. 1,330,896 to Blakemore teaches using certain high temperature peroxides, such as 3,5-dimethyl-3,5-di-t-butylperoxy-1,2-dioxolane, as co-initiators to produce polymers with low residual monomer concentration. However, Blakemore reports that the residual styrene content of the resultant polystyrene was greater than 0.1%. Further, the co-initiators described by Blakemore also have the disadvantage that the polymerization temperature has to be quite high. For example in the two stage procedure described by Blakemore, the final stage of the polymerization is conducted at 175°–185° for two hours.

Blakemore in British Pat. No. 1,329,859 describes the use of other co-initiators such as 1,1,4,4,7,7-hexamethyl-cyclo-4,7-diperoxynonane, which require excessively high polymerization temperatures.

Beresniewicz (U.S. Pat. No. 3,534,009) describes a method for reducing the residual vinyl acetate monomer content during the copolymerization of vinyl acetate and ethylene. After the main copolymerization the pressure is reduced from 100–3000 psi to atmospheric pressure and a source of free radicals (e.g. peroxide initiator) is added to the system to reduce the residual vinyl acetate content to less than 0.35%.

Thompson and Jursich (Ref. U.S. Pat. No. 3,414,547) describe a polymerization process wherein a combination of a peroxide and an azo initiator is used to effectively reduce the residual monomer concentration. Most of the polymerization is done by the peroxide initiator and the azo initiator is the finishing catalyst. Catalysts other than the azo compounds are disclosed as not capable of reducing the residual monomer content below 2% by weight.

Bergmeister and Stoll (Ref. Ger. Offen. No. 2,229,569) describe a mixed catalyst system for preparing vinyl acetate copolymers. Using 2,2-bis(t-butylperoxy)butane in combination with another peroxide, such as benzoyl peroxide, produces a copolymer with a residual monomer concentration of 0.3% by weight as opposed to 2.1% by weight of vinyl acetate in the absence of 2,2-bis(t-butylperoxy)butane. A residual monomer concentration of 0.3% is not acceptable in most applications and especially in polymers which are used in contact with food.

The abstract of Japanese Pat. No. 74200/76 in Derwent Japanese Patents Report (Vol. 74, No. 21, page A + E-2, issued June 25, 1974) describes a process for the manufacture of copolymers of alpha-methylstyrene, acrylonitrile and styrene using azobiscyclohexanenitrile in combination with dicumyl peroxide and/or di-t-butyl peroxide as the initiators in a temperature range of 80°–130° C.

Guillet and Towne (U.S. Pat. Nos. 3,337,602 and 3,287,337) disclose novel peroxides useful as polymerization initiators, which have the general structure,

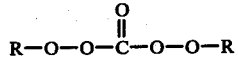

where R is the same or different aliphatic, cycloaliphatic or aromatic hydrocarbyl or substituted hydrocarbyl, desirably containing 5 to 20 carbon atoms.

Other patents which contain teachings relevant to lowering residual monomer content in polymers are U.S. Pat. No. 3,784,532, to Fellmann and Uhang and Canadian Pat. No. 751,552 (which discloses the use of di-t-butyl-diperoxycarbonate as a polymerization initiator, but not as a finishing catalyst).

STATEMENT OF THE INVENTION

The present invention provides a novel and useful process for the free-radical polymerization of vinyl monomers, including vinyl aromatic monomers, at at least two distinct, progressively higher polymerization temperatures, each between the temperatures of from about 50° C. and 130° C., in the presence of at least two free-radical initiators, one of which, used in relatively minor proportions, is di-t-butyl diperoxycarbonate (the "finishing" initiator) and the other, used in relatively major proportions, has a ten hour half-life temperature below 90° C. The distinct temperatures for polymerization may occur as separate parts of a polymerization in which the temperature of the system continually increases. Typically, the amount of the finishing initiator is minor compared to the total weight of other initiators which provide free radicals in the process. Preferably over 75% by weight (more preferred, all) of the initiators have a ten-hour half-life less than that of di-t-butyl diperoxycarbonate. As used herein, when describing the present invention, the word "polymer" includes homopolymers, copolymers, terpolymers and monomer crosslinking.

As opposed to prior art processes, this invention provides a process of preparing substantially monomer-free (i.e. no more than 0.1% by weight) polymer with a relatively fast polymerization rate. Thus the polymerization time, by the process of this invention, is substantially less than with prior art process (typically, at least 4 hours less).

Thus, one advantage of the invention is that it can be used to obtain substantially monomer free polymers in a relatively short time. The reduction in polymerization time leads to substantial cost-savings in commercial operations. Typically, the time to produce polymer without more than 0.1 weight % residual monomer can be reduced by as much as 20% of the time required if the di-t-butyl diperoxycarbonate finishing initiator were not present in the systems illustrated.

The diperoxycarbonate initiator of this invention is easily prepared (Ref. Davies and Hunter, J. Chem. Soc., p. 1808, 1953) from relatively inexpensive raw materials such as t-butyl hydroperoxide and phosgene.

In general, in the process of the present invention, the di-t-butyl diperoxycarbonate finishing catalyst is a high temperature component, that is, it requires relatively high polymerization temperatures for decomposition, compared to the other compounds which provide free radicals in the process (and which can be described, relative to the di-t-butyl diperoxide, as "low temperature initiators").

Preferably, no other initiator in the system will have a 10-hour half life temperature above that of di-t-butyl-diperoxycarbonate. However, the process of the present invention can be practiced where less than 50% (preferably less than 15%) by weight of the initiator composition comprises components having a ten-hour half life temperature higher than that of di-t-butyl-diperoxycarbonate.

"Low temperature" initiators are described, for example, in Canadian Pat. No. 915,850. It should be noted that the terms high and low must be used relative to specific initiators. There are many initiators which require much higher decomposition temperatures than di-t-butyl diperoxycarbonate; however, excessively high polymerization temperatures can lead to undesirable polymer degradation.

Half-life is defined as the time it takes for one half of a given quantity of peroxide in dilute solution to decompose.

The nature of the low temperature free radical initiator is not critical but preferably it should have a 10 hour half life temperature less than that of di-t-butyl diperoxycarbonate (about 91° C.). The initiator can be one or more of the well known azo and/or peroxide free radical initiators. A partial list of these is given below:

Benzoyl peroxide; t-butyl peroctoate; t-butyl peroxypivalate; lauroyl peroxide; 2,5-dimethyl-2,5-bis(2-ethylhexanoylperoxy)-hexane; acetyl peroxide; t-butyl peracetate; 2,5-dimethyl-2,5-bis(benzoylperoxy)-hexane; 1,1-bis(t-butylperoxy)-3,3,5-trimethyl-cyclohexane; 1,8 and 1,9-di-(t-butylperoxycarbonyl)heptadecane; ethylene-bis(4-t-butylazo-4-cyanovalerate); di-t-butyl-diperoxyazelate; azobis-isobutyronitrile; 2-t-butylazo-2-cyanopropane; 1-t-butylazo-1-cyanocyclohexane; 2,2'-azo-bis-(2-methylvaleronitrile); di-t-butyl 4,4'-azobis-(4-cyanoperoxyvalerate); di-(2-ethylhexyl) peroxydicarbonate, acetyl cyclohexyl-sulfonyl peroxide, the diperoxy ketals, azocumene, 2-t-butylazo-2-cyano-4-methoxy-4-methylpentane; 2-t-butylazo-2-cyano-4-methylpentane; 2,2'-azobis(2,4-dimethylvaleronitrile); and 1,3-dimethyl-3-(t-butylperoxy)butyl 4-t-butylazo-4-cyanovalerate.

It is preferred that no other initiator in the system have a ten hour half-life as great as that of di-t-butyl diperoxycarbonate. In this respect it should be noted that the 10 hour half-life of a given initiator can vary somewhat depending on the solvent used in the measurement; however, it is understood that where possible the same solvent should be used for all substances measured.

While any of the known polymerization techniques can be used in the practice of this invention, in the preferred methods, the polymerization is conducted in bulk, solution and/or suspension. Further, the process can be either a batch type reaction and/or a continuous reaction.

The polymerization can be conducted isothermally in one or more stages and/or non-isothermally by using a programmed temperature cycle. In the preferred method, the polymerization is conducted with a programmed temperature cycle thereby using a major portion of the heat of polymerization to heat the reactor contents.

The rate at which the temperature is increased (or allowed to increase) during the polymerization, i.e. $\Delta T/\Delta t$ where $\Delta T$ is the increase in temperature in time $\Delta t$, will be influenced by factors such as the desired molecular weight, the available cooling capacity, reaction pressure etc. In general $\Delta T/\Delta t$ can have values of 5° C./hour to 50° C./hour, preferably it will have values of 10° C./hour to 40° C.;hour. $\Delta T/\Delta t$ can be constant or varied (particularly at the higher temperature range) during the course of the polymerization. The polymerization may also be conducted isothermally, (i.e., $\Delta T/\Delta t = 0$) at multiple, distinct, progressively higher temperature.

The operating polymerization temperature range can vary from about 40° C. to 160° C., preferably from 50° C. to 130° C.

In the preferred method, vinyl monomers such as styrene, vinyl toluene, dichloro styrene etc. are homo polymerized and/or copolymerized with one or more vinyl or vinylidene monomers.

All vinyl and/or vinylidene type monomers which can be polymerized by a free radical mechanism can be used in the practice of this invention. This includes vinyl aromatic monomers such as styrene, hydrocarbyl substituted styrenes, such as t-butyl styrene, vinyl-toluene and partially or fully hydrogenated or halogenated derivatives of such vinyl aromatics (e.g. vinylcyclohexane, chloro-, fluoro- or bromostyrenes, etc. Other operable vinyl monomers include vinyl chloride, vinylidene chloride, tetrafluoroethylene, esters of acrylic/methacrylic acid such as methyl acrylate, methyl methacrylate, ethyl methacrylate, lauryl methacrylate, isobutyl methacrylate, diethylenglycol-dimethacrylate, trimethylol-propane tri-methacrylate, etc. Other vinyl esters, such as vinyl acetate, vinyl propionate, vinyl stearate, diene monomers such as butadiene, isoprene, chloroprene, etc.; other monomers such as acrylamide, methacrylamide, etc.; allylic monomers such as di-allyl phthalate, di-allyl maleate, allyl diglycol carbonate, etc.; acrylonitrile, methacrylonitrile.

A partial list of the monomers that can be used in the copolymerization of vinyl aromatic compounds includes: methyl methacrylate; acrylonitrile; ethyl methacrylate; methacrylonitrile, isobutyl methacrylate; methyl acrylate; diethylenglycol dimethacrylate; trimethylolpropane trimethacrylate; isoprene; chloroprene; 1,3-butadiene; 2-fluoro-1, 3-butadiene; maleic anhydride, other vinyl aromatics (e.g. styrene and alpha-methylstyrene).

The total concentration of the initiator mixture used in the process of this invention will depend upon the monomer(s) and the polymerization conditions selected. Generally it will be in the range of 0.01-2% by weight (based on total monomer concentration) and preferably 0.01-1%. Typically, the ratio of low temperature initiator to finishing (i.e., high temperature) initiator is at least 2:1 on a weight basis. Generally, the concentration of the finishing initiator on a pure basis is 0.001 to 1% based on total monomer, more preferred 0.005 to 0.5% by weight.

The term "pure basis" means than any impurities in the composition are not included when calculating the initiator concentration. All percentages are by weight unless otherwise specified.

ILLUSTRATIVE EXAMPLES

The following examples illustrate the test procedure in the comparative evaluation of a number of polymerization initiators as finishing catalysts. In commercial homopolymerization of styrene, the final polymer must contain no more than 0.1 weight % residual monomer. Accordingly, in the test procedure of the examples, only those test materials which produced polymer containing no more than 0.1% residual monomer were considered to be useful as finishing catalysts.

Experimental Procedure

Based on a charge of 5 grams monomer (styrene), the amount of each initiator component required was calculated using its assay value. Thus all initiator concentrations are expressed on a pure basis as parts per hundred of monomer even when the initiator composition used contained less than 100% of the initiator.

The initiators were weighed in "petti-cups" which were placed in Pyrex test-tubes, 18 × 150 mm. These were tared, 5 grams of styrene was added, then they were chilled in ice-water, purged with nitrogen and sealed with a flame-torch.

The sealed test-tubes were immersed in a thermostated, stirred oil-bath, the temperature of which was adjusted to the desired rate by using a rheostat.

At the end of the polymerization, the test-tubes were removed from the oil-bath and placed in cooled copper tubes and then in a freezer, (to assure that there was no postpolymerization) for at least half-an-hour. The test-tubes were then broken and the polymer dissolved in 50 ml. of benzene (containing 0.01g benzoquinone per liter of benzene). A portion of this solution was used to determine the residual styrene content by gas chromatography. To recover the polymer, the rest of the solution was precipitated in 300 ml. of methanol. The polymer was filtered, and dried in a vacuum oven at 50° C.

To calculate the viscosity-average molecular weight ($\overline{M}_v$), a benzene solution of the polymer (0.5 g/dl) was used to measure the viscosity in a Cannon-Ubbelhode viscometer at 25° C. By extrapolating the viscosity data to zero concentration in the usual manner, the value of intrinsic viscosity ([n]) was obtained from which $\overline{M}_v$ was calculated by using the relationship of *J. Phys. Chem.*, 67, 566 (1963):

$$[n] = K\overline{M}_v^a$$

where for Polystyrene
$K = 9.18 \times 10 -5$
$a = 0.743$

For other polymers and/or solvent combinations, the corresponding values of K and a are readily available in the *Polymer Handbook*, edited by J. Brandrup and E. H. Immergut, Second Edition, 1975 John Wiley & Sons, Inc.

The molecular weight distribution of the polymer, i.e. the ratio of the weight-average to the number average molecular weight ($\overline{M}_w/\overline{M}_n$) was determined by using gel permeation chromatography. Unless otherwise indicated, the solvent was tetrahydrofuran (THF).

Anionically prepared, narrow molecular weight distribution polystyrene standards (from Waters Associates, Inc.) were used to prepare a calibration curve from which the value of $\overline{M}_w/\overline{M}_n$ of polymer samples was determined.

| Initiator Abbreviations Used in Examples | |
|---|---|
| R-262 | di-t-butyl diperoxycarbonate |
| R-H | 1,8-Di-(t-butylperoxycarbonyl)heptadecane |
| Luperox 118 | 2,5-Dimethyl-2-5-bis(benzoylperoxy)hexane |
| TBPB | t-Butyl Perbenzoate |
| TBPA | t-Butyl Peracetate |
| TBIC | OO-t-Butyl-0-Isopropyl Monoperoxycarbonate |
| Luperox 500R | Dicumyl Peroxide |
| DTBP | Di-t-butyl Peroxide |
| R-233 | Ethyl 3,3-Bis(t-butylperoxy)butyrate |
| Lupersol 101 | 2,5-Dimethy-2,5-di(t-butylperoxy)hexane |
| TDIB | alpha,alpha-Bis(t-butylperoxy)disopropylbenzene |
| D-230 | n-Butyl 4,4-Bis (t-butylperoxy)valerate |
| R-PA | 2,2-Di-(t-butylperoxy)propyl Acetate |
| Lupersol 256 | 2,5-Dimethyl-2,5-bis(2-ethylhexanoylperoxy)-hexane |

EXAMPLE I

The following four initiators were evaluated as finishing catalysts in styrene bulk polymerization.
TBPB = t-Butyl Perbenzoate
Lupersol 231 = 1,1-Bis(t-butylperoxy)-3,3,5 trimethylcyclohexane
R-262 = Di-t-butyl Diperoxycarbonate
R-PM = 1,1-Di(t-butylperoxy)-1-phenylmethane
Test tubes were prepared containing 5 g. of styrene, 0.25 phm of benzoyl peroxide and 0.05 phm of the different finishing catalysts. The polymerization was started at 60° C. and the temperature was increased continuously so as to get the following profile.

| Time (Hours) | 0 | 0.5 | 1.0 | 2.0 | 3.0 | 4.0 | 5.0 |
|---|---|---|---|---|---|---|---|
| Temp. (° C) | 60 | 70 | 80 | 90 | 100 | 110 | 120 |

Total polymerization time = 5 hours. The concentration of residual styrene in each of the samples, as measured by gas chromatography is shown in Table I. The results in Table I, show that of the four finishing catalysts evaluated, only one, i.e. R-262 (di-t-butyl diperoxycarbonate) is capable of giving a residual monomer content of less than 0.1% by weight, in a relatively short polymerization time of 5 hours.

Table I

STYRENE BULK POLYMERIZATION

| Finishing Catalyst | % Residual Styrene |
|---|---|
| TBPB | 2.5 |
| Lupersol 231 | 1.6 |
| R-262 | <0.1 |
| R-PM | >2.6 |

Two of the polystyrene samples prepared above were used to characterize the molecular weight distribution. The samples used and the corresponding gel permeation chromatography results are as follows:

| Sample No. | $\overline{M}_v \times 10^{-5}$ | $\overline{M}_n \times 10^4$ | $\overline{M}_w/\overline{M}_n$ |
|---|---|---|---|
| 1-4203-31 | 3.03 | 9.91 | 3.06 |
| 3-4203-31 | 2.61 | 8.42 | 3.10 | t-butylperbenzoate was used as the finishing initiator in 1-4203-31 and di-t-butyl diperoxycarbonate in 3-4203-31. The molecular weight distribution results i.e. $\overline{M}_w/\overline{M}_n$ show that within experimental error, there is no difference. Thus di-t-butyl diperoxycarbonate can be used as an efficient finishing initiator without altering the molecular weight distribution of the resulting polymer.

When di-t-amyl diperoxycarbonate is substituted for R-262 initiator under the same conditions as that employed above, the residual styrene in the resulting polymer was 1.8% by weight.

EXAMPLE II

The polymerization of styrene was conducted in a bulk technique in two isothermal heating stages. The first stage at 90° C. for 4 hours and the second stage at 120° C. for three hours. The following initiator mixtures were used.

A. 0.15 phm Lupersol 256 + 0.05 phm Luperox 118 + 0.02 phm TBPB

B. 0.05 phm Lupersol 256 + 0.05 phm Luperox 118 + 0.02 phm R-262

The residual styrene concentration of the polymers using these two initiator mixtures is given below.

| Initiator Mixture | A. | B. |
|---|---|---|
| Residual Styrene | 0.12% | 0.06% |

These results show that di-t-butyl diperoxycarbonate acts as a good finishing catalyst even when the polymerization is conducted in two isothermal heating stages.

I claim:

1. A process for the free-radical polymerization of a vinyl monomer, including vinyl aromatic monomer, comprising polymerizing said monomer at at least two distinct, progressively higher polymerization temperatures, each between the temperatures of from about 50° C. to 130° C., in the presence of at least two free-radical initiators, one of which, used in relatively minor proportions as a finishing catalyst, is a di-t-butyl piperoxycarbonate and the other, has a ten hour half-life temperature below 90° C., wherein the same solvent is used for measuring the half life of all initiators, wherein the time to produce polymer without more than 0.1 weight percent residual monomer can be reduced by as much as 20% of the time required if the di-t-butyl diperoxycarbonate finishing initiator were not present.

2. The process of claim 1 wherein the polymerization process is conducted isothermally at two distinct temperatures.

3. The process of claim 1 wherein the distinct temperatures occur as separate parts of the polymerization in which the temperature of the system continually increases.

4. The process of claim 1 wherein the initiator having the ten hour half-life temperature below 90° C. is benzoyl peroxide.

5. The process of claim 1 wherein the vinyl monomer is styrene.

* * * * *